May 21, 1929.　　　　A. VILA　　　　1,714,466
SCAFFOLD
Filed Sept. 9, 1927　　9 Sheets-Sheet 2
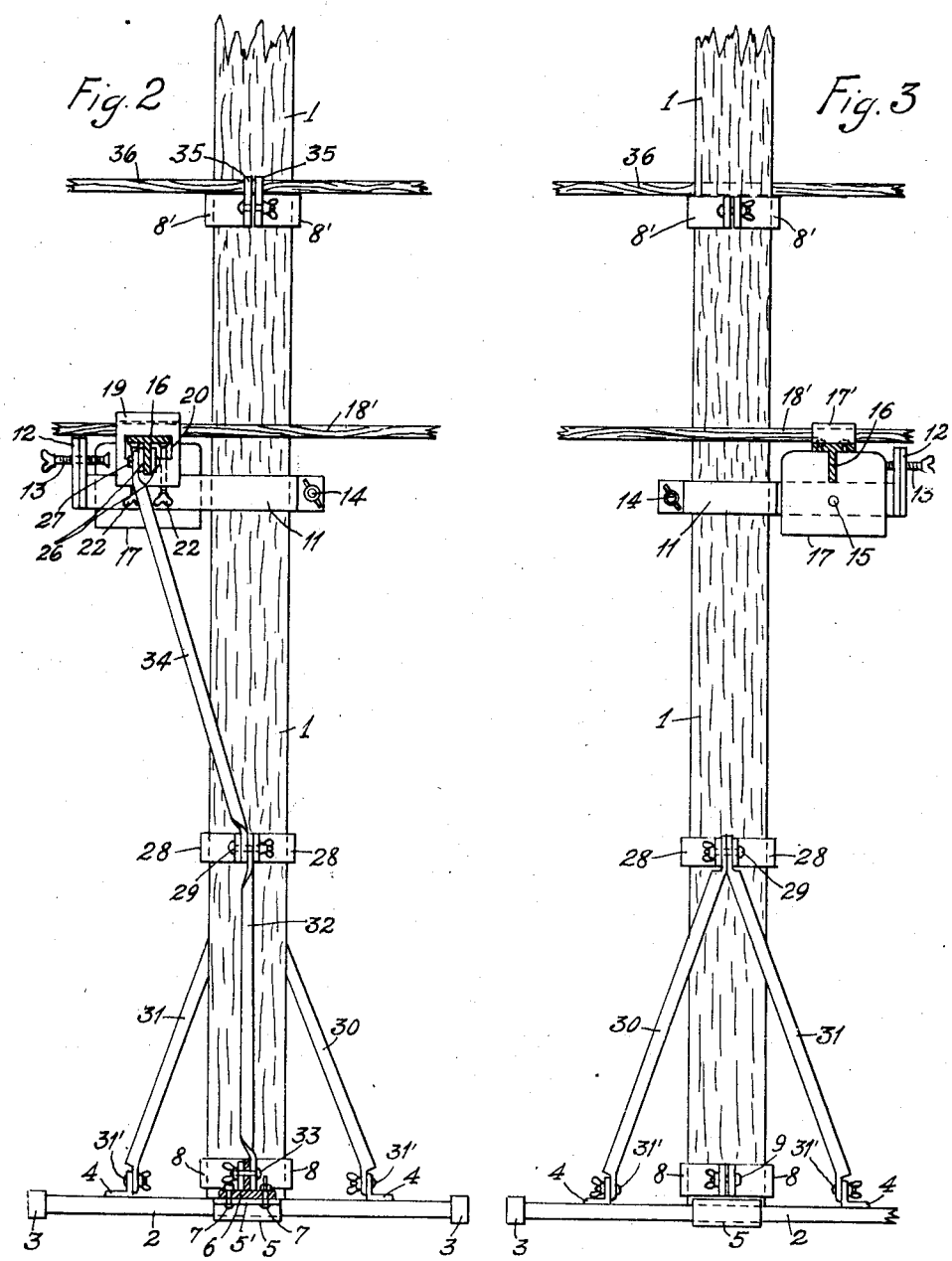

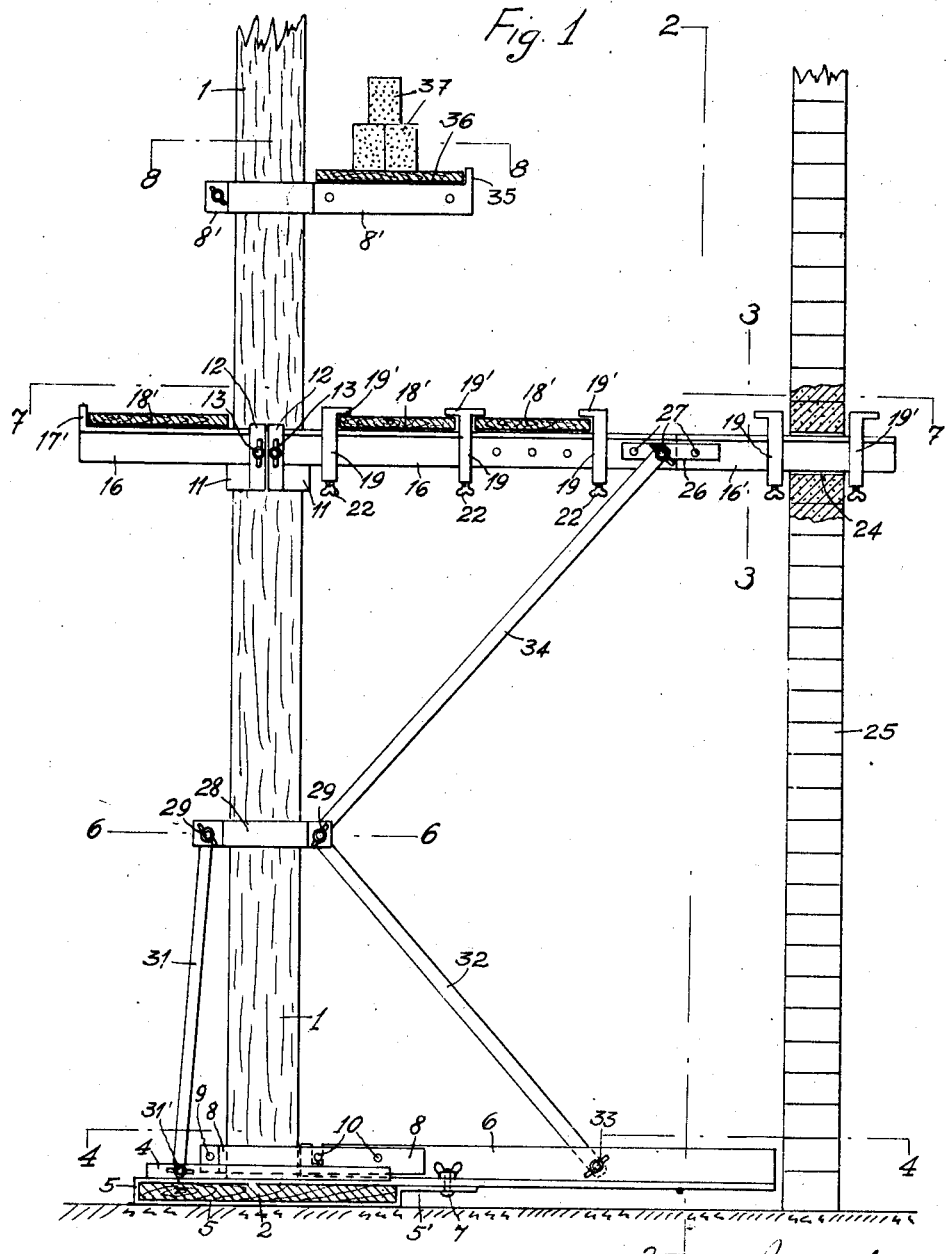

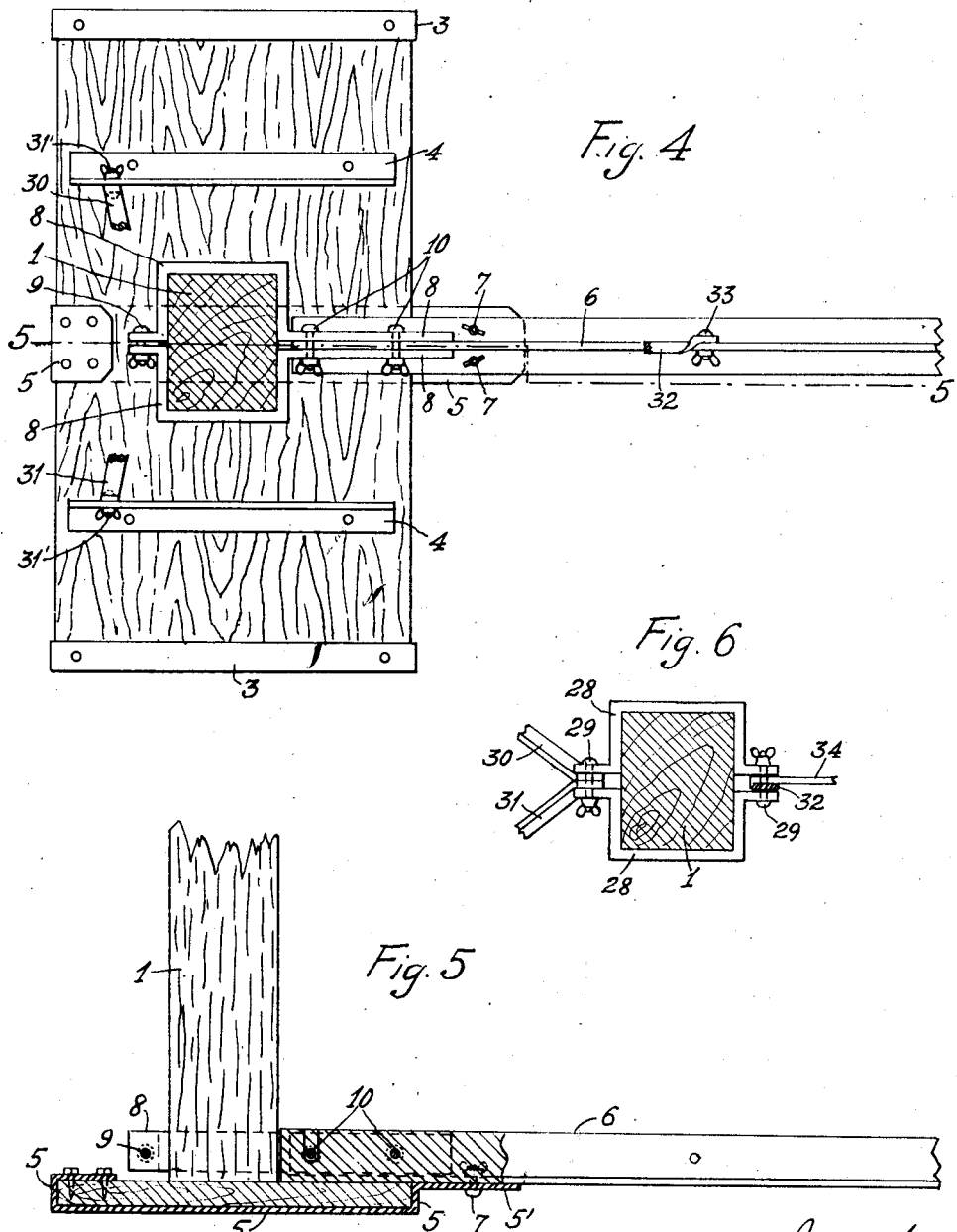

May 21, 1929.　　　A. VILA　　　1,714,466
SCAFFOLD
Filed Sept. 9, 1927　　9 Sheets-Sheet 4
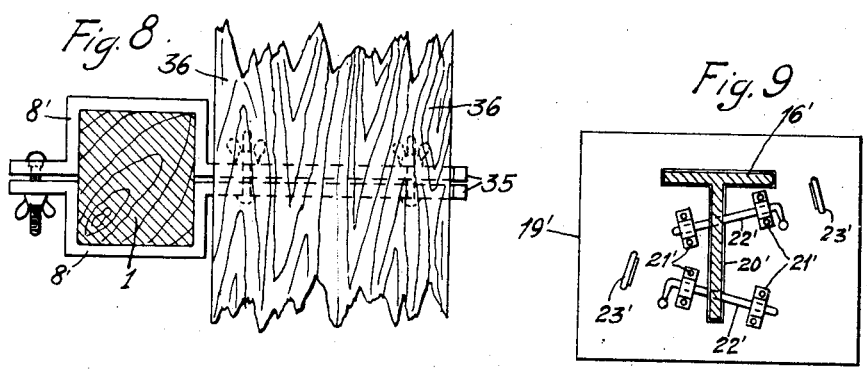
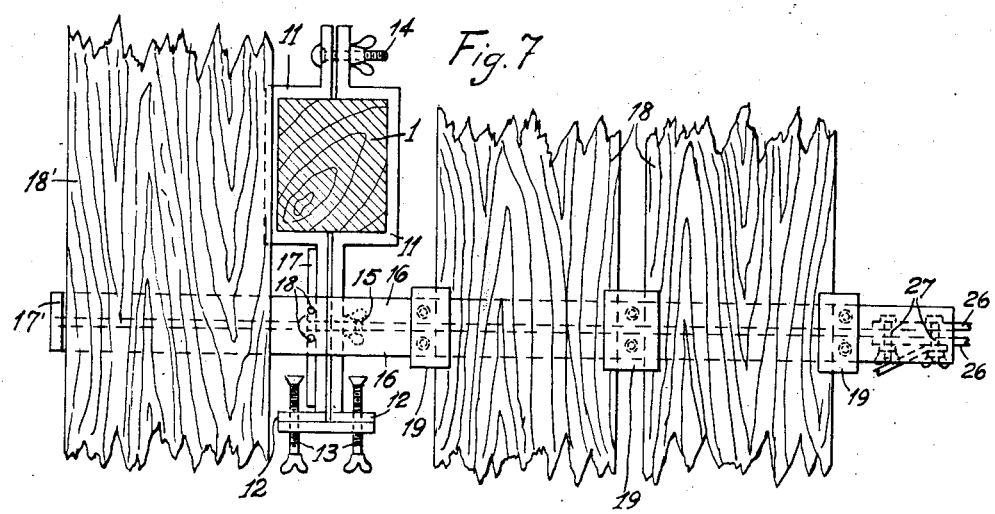
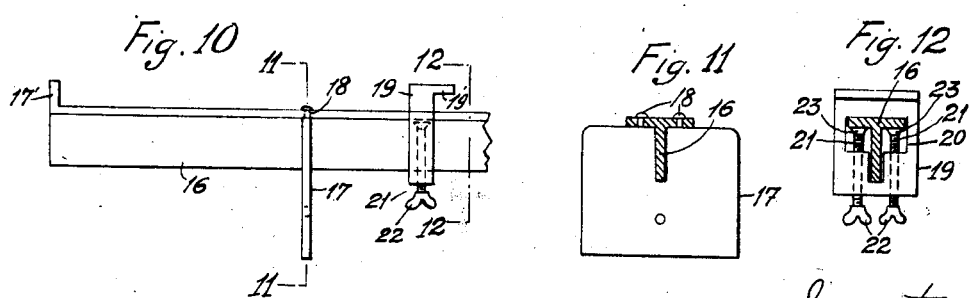
Inventor
Alfonso Vila
By B. Singer, Atty

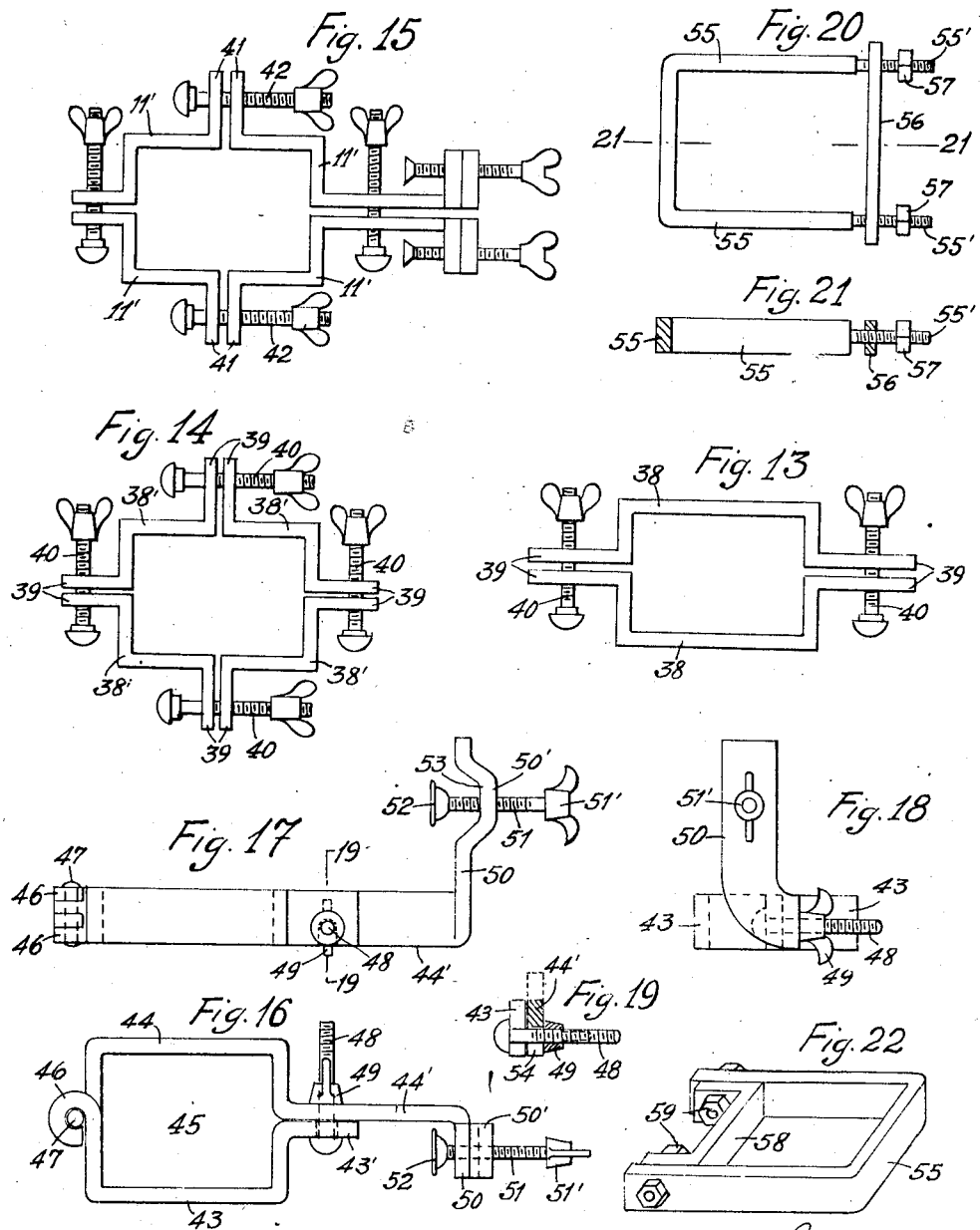

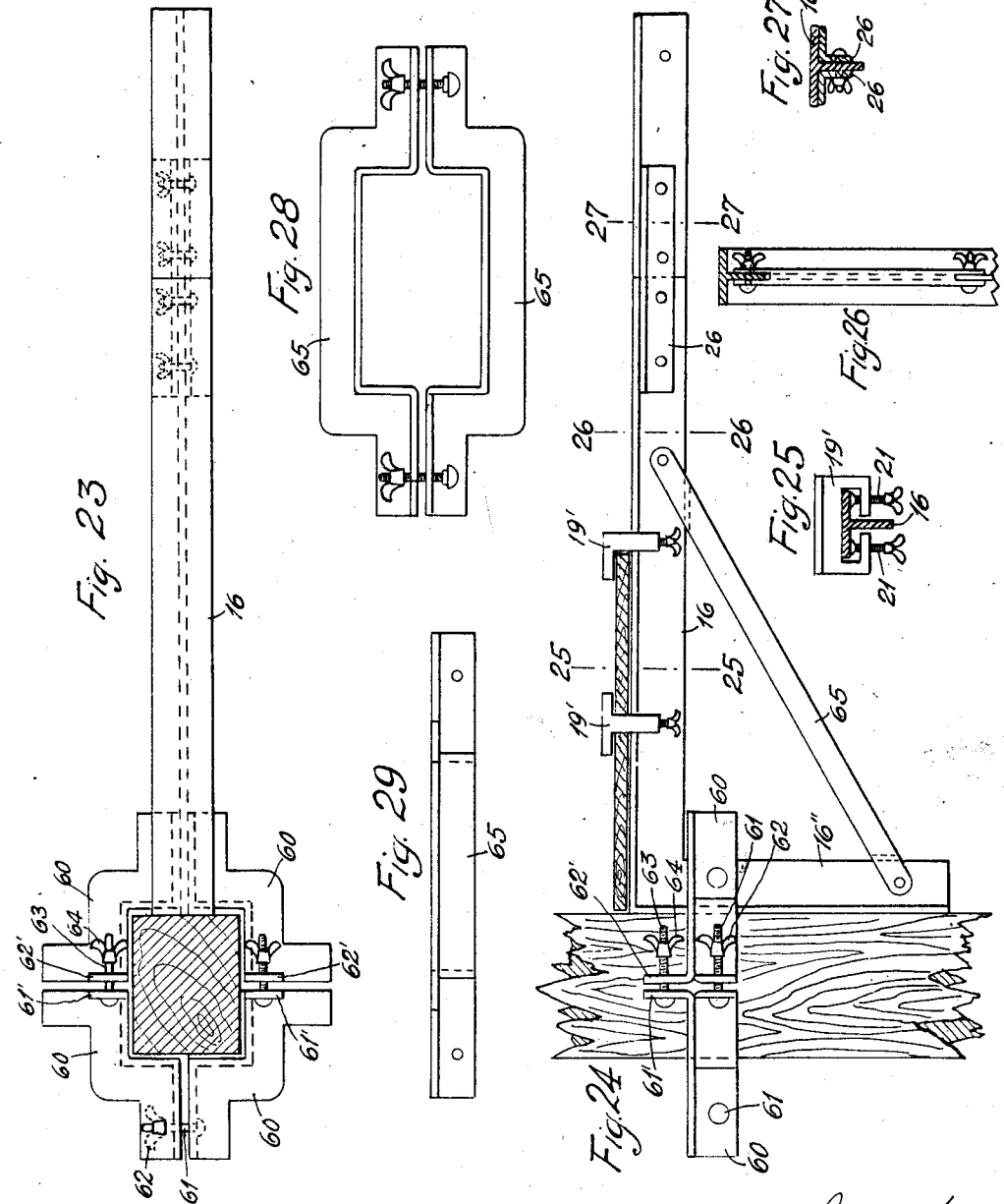

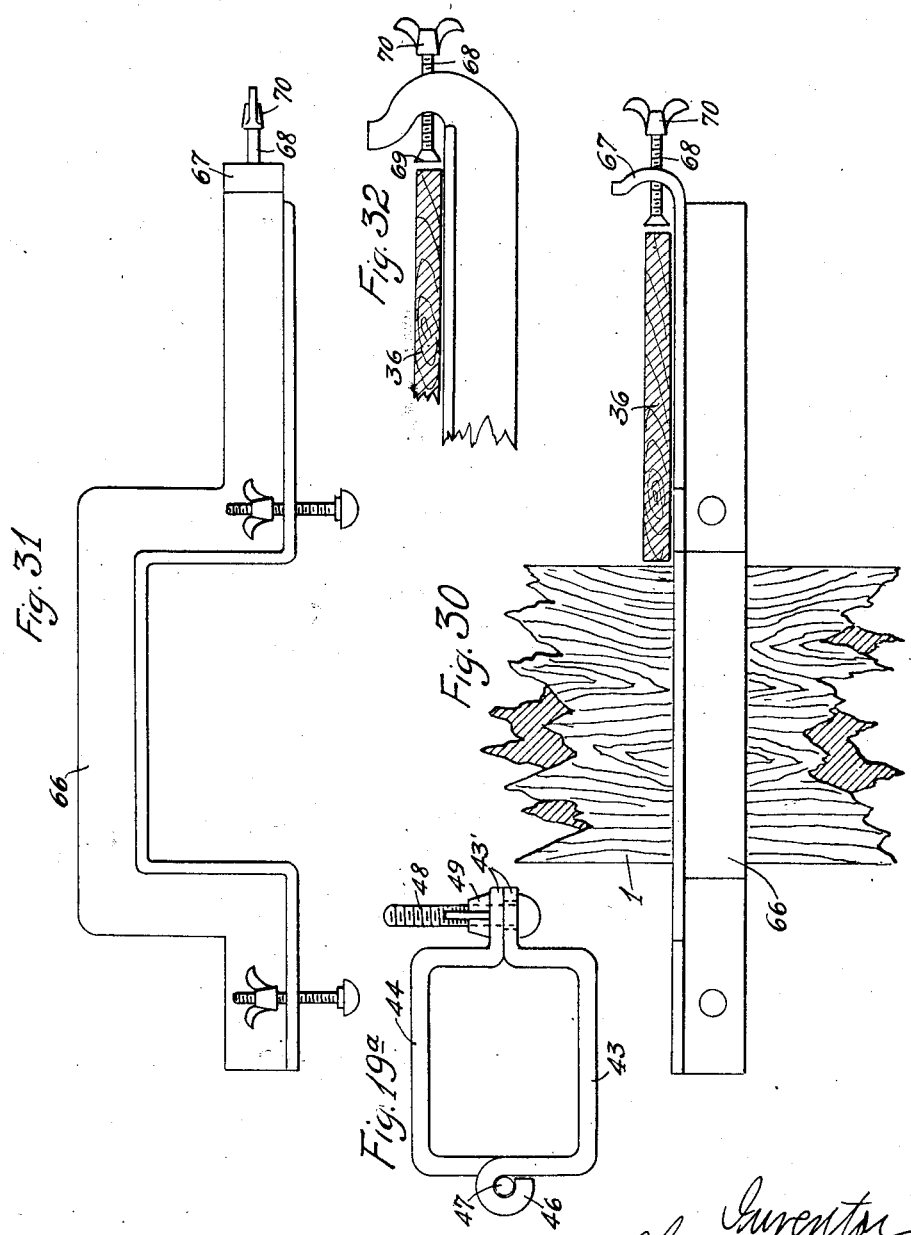

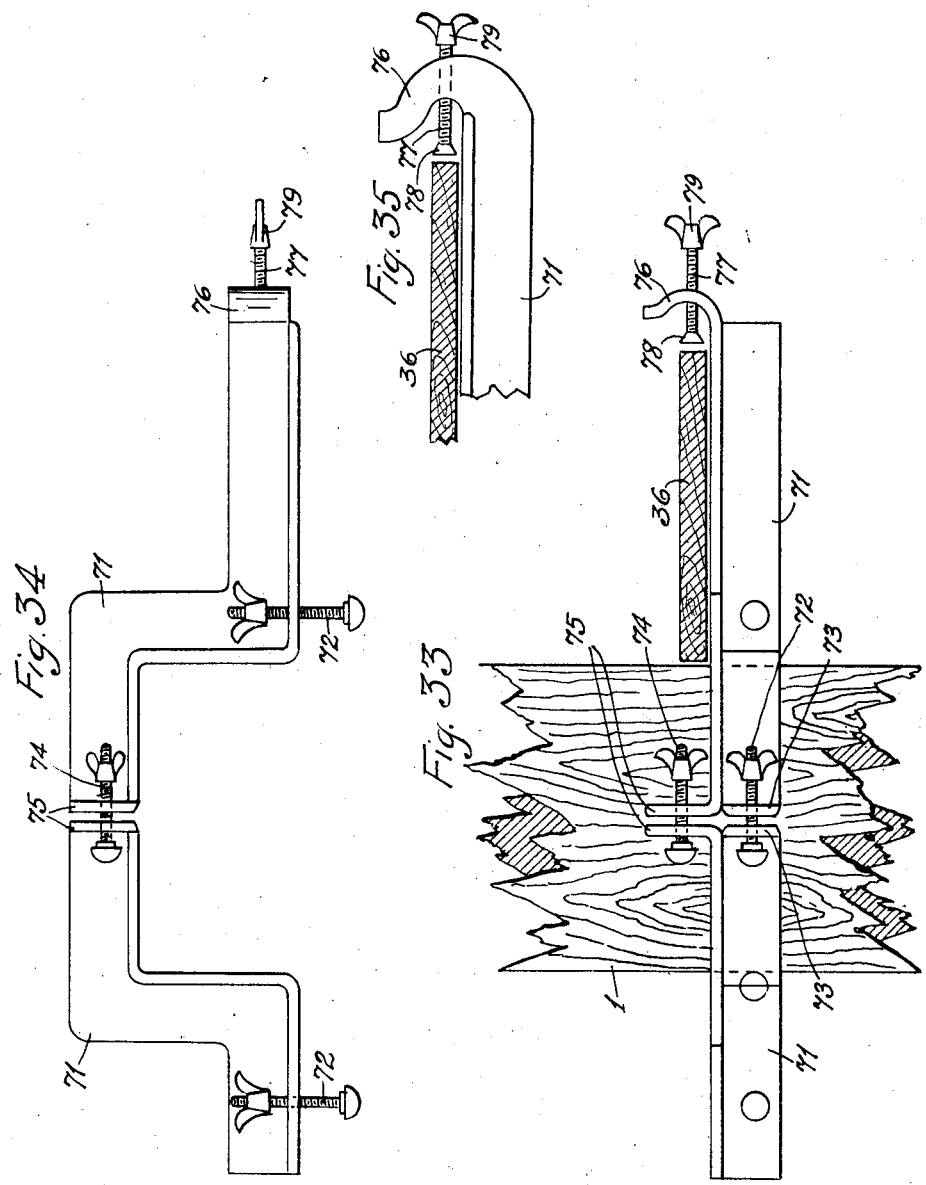

May 21, 1929.  A. VILA  1,714,466
SCAFFOLD
Filed Sept. 9, 1927  9 Sheets-Sheet 9
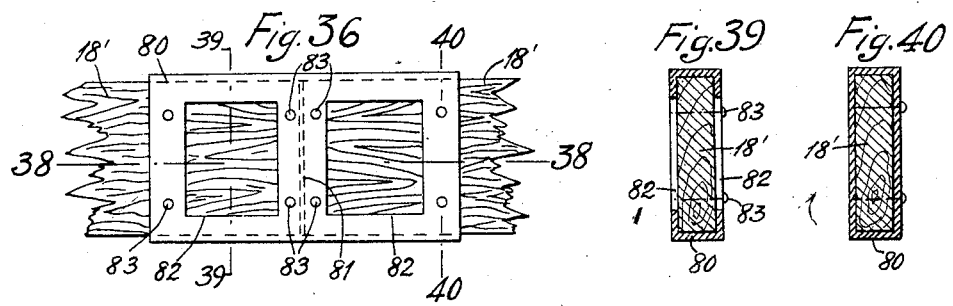
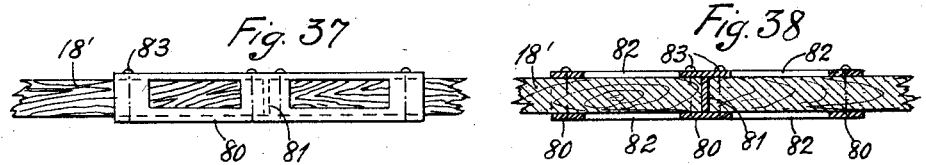
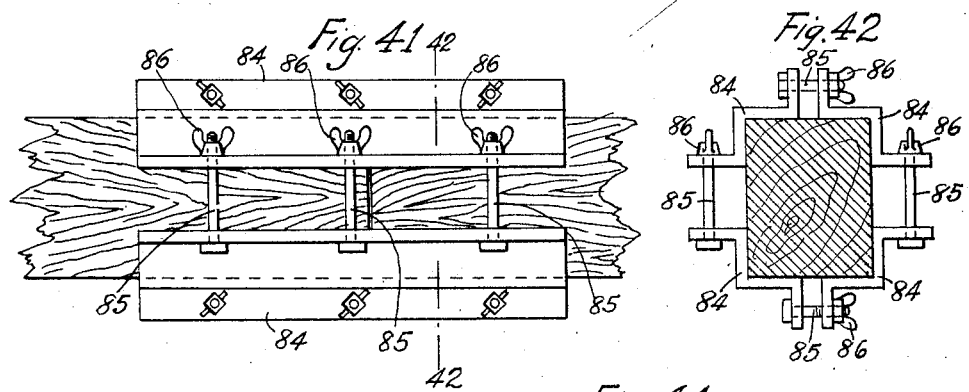
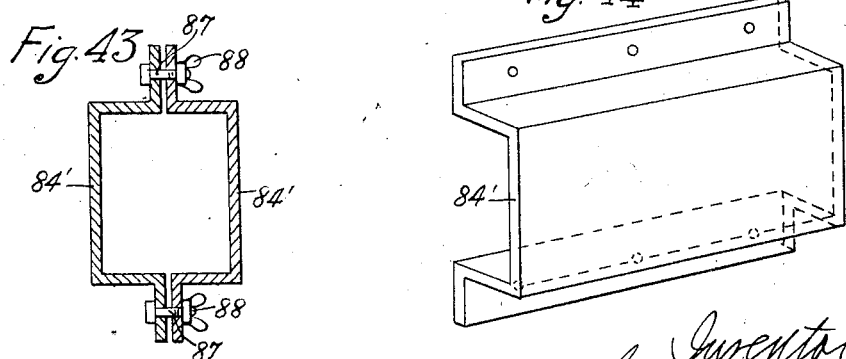

Patented May 21, 1929.

1,714,466

UNITED STATES PATENT OFFICE.

ALFONSO VILA, OF GUANABACOA, HABANA, CUBA.

SCAFFOLD.

Application filed September 9, 1927, Serial No. 218,537, and in Cuba June 6, 1927.

This invention relates to improvements in scaffolds, the object of the invention being to provide an improved scaffold which is very strong and durable, and which may be readily set up and dismantled.

Another object is to provide an improved construction of the clamps for scaffold which were the object of my U. S. patent application filed October 14, 1926, Ser. No. 141,625.

The invention is described with reference to the figures of the enclosed drawings, of which:—

Fig. 1 is a front elevation of a scaffold provided with the improvements which are the subject matter of this invention.

Fig. 2 is a vertical transverse section on the line 2—2 of Fig. 1.

Fig. 3 is a vertical transverse section on the line 3—3 of Fig. 1.

Fig. 4 is a horizontal section on the line 4—4 of Fig. 1.

Fig. 5 is a vertical longitudinal section on the line 5—5 of Fig. 4.

Fig. 6 is a horizontal section on the line 6—6 of Fig. 1.

Fig. 7 is a horizontal section on the line 7—7 of Fig. 1.

Fig. 8 is a horizontal section on the line 8—8 of Fig. 1.

Fig. 9 is a detail showing a modified form of the vertical plates mounted on the supporting beam of the scaffold and close to the wall.

Fig. 10 is a detail showing in side elevation the beam supporting the scaffold and one of the board clamping clips upon the same.

Fig. 11 is a vertical transverse section on the line 11—11 of Fig. 10.

Fig. 12 is a vertical transverse section on the line 12—12 of Fig. 10.

Fig. 13 is an upper plan view of a simple clamp.

Fig. 14 is an upper plan view of a four piece clamp having short arms.

Fig. 15 is an upper plan view of a four piece clamp having short and long arms.

Fig. 16 is an upper plan view of a modified form of clamp having hinges at one end.

Fig. 17 is a side elevation of the same clamp.

Fig. 18 is an end elevation of the same clamp.

Fig. 19 is a vertical transverse section on the line 19—19 of Fig. 17.

Fig. 19ª is an upper plan view of the same modified form of Fig. 16 having the arms all of the same length.

Fig. 20 is an upper plan view of another modified form of clamp.

Fig. 21 is a vertical longitudinal section on the line 21—21 of Fig. 20.

Fig. 22 is a perspective view of another modified form of clamp.

Fig. 23 is an upper plan view of a scaffold including a modified form of the clamp and supporting beam.

Fig. 24 is a side elevation of the same modified scaffold.

Fig. 25 is a vertical transverse section on the line 25—25 of Fig. 24.

Fig. 26 is a vertical transverse section on the line 26—26 of Fig. 24.

Fig. 27 is a vertical transverse section on the line 27—27 of Fig. 24.

Fig. 28 is a detail showing a modified form of simple clamp as viewed uppermost.

Fig. 29 is a side elevation of the same clamp.

Fig. 30 is a side elevation of a form of clamp which is a modification of the one shown in Figures 28 and 29, placed upon an upright and supporting a board.

Fig. 31 is an upper plan view of one half of said modified clamp.

Fig. 32 is a partial side elevation of just another modification of the same clamp.

Fig. 33 is a side elevation of a form of clamp which is a modification of the one shown in Figs. 23 and 24, placed on an upright and supporting a board.

Fig. 34 is an upper plan view of a half of said last clamp.

Fig. 35 is just another fragmental side elevation of a further modified form of the same clamp.

Fig. 36 is an upper plan view of a board joint.

Fig. 37 is a side elevation of the same.

Fig. 38 is a vertical longitudinal section on the line 38—38 of Fig. 36.

Fig. 39 is a vertical transverse section on the line 39—39 of Fig. 36.

Fig. 40 is a vertical transverse section on the line 40—40 of Fig. 36.

Fig. 41 is a side elevation of a joint of upright sections.

Fig. 42 is an end elevation of same.

Fig. 43 is a transverse section of a modified form of joint for the uprights.

And Fig. 44 is a detailed view showing in perspective one of the halves of a joint for the upright sections.

Referring to Figures 1 to 12 both inclusive, of the drawings this scaffold comprises an upright or post 1 made of wood, rising upon a wooden base 2 provided at its edges with metallic rims in the form of small plates 3, to avoid its splitting and has fixed on its upper face, spaced from its ends approximately one quarter length reinforcing metallic plates of angular section 4 which are fixed onto same by means of screws and in its center, said base 2 has a metallic joining plate 5 which is located on the underside of same and bends up at one end, towards the upper face and on the other end also bends upwards forming a horizontal extension 5' that levels with the upper face of said base 2 and extends outward from same to receive an inverted T section metallic girder 6, to which is fixed by means of bolts 7 passing through holes in the wings of said girder 6 and holes in the extension 5' of said plate 5, the body of said girder 6 being received between the two longer arms of a clamp that embraces the upright on its base and is composed of two branches 8 vertical in form, which on their middle portion are bent outwards in U shape in order to leave a central space of square section where the post or upright 1 is received, the two shorter arms of it being held together by means of bolts 9 and their respective nuts, and the two longer arms being secured to the web of girder 6 by means of bolts 10 and their nuts.

In the upper portion of the upright 1 it is embraced by a clamp of the type described in my U. S. patent application Ser. No. 141,625, comprising two branches having short arms at one end and long arms at the other end, bent in U shape at their middle portion, the ends of the longer arms having raised portions 12 which serve as a support, respectively, for horizontally located bolts 13 that screw through countersunk holes in said portions 12 and are placed in the longitudinal direction of the clamp, the arms of the branches being held together by means of screws 14 and 15 and upon the longer arms of the branches 11 of the clamp is located a T section supporting beam 16 which rests upon said branches at the lower edge of its web, but said beam 16 also has annexed a vertical metallic plate 17 which is fixed to same by means of two small pins 18 that abut from its upper edge and pass thru holes in the wings of said beam 16, being riveted there and this vertical plate 17 comes to rest close to one of the longer arms of the clamp, the two arms being held there by means of the bolt 15 that holds them together. The supporting beam 16 has on one end, spaced a certain distance from the post 1, a raised flange 17' that serves as a stop to the boarding 18' and on the opposite side of the upright 1 are mounted upon the supporting beam 16 a series of clips 19 spaced apart, designed to hold the boards 18' that form the floor of the scaffold, each clip 19 being formed by a vertical plate that has on its upper end a simple or double wing 19' to rest against the upper face of board 18' and on its middle portion, it has a cut or opening of rectangular section 20 and provided with a narrow extension vertically directed towards the bottom in order to receive the web of the beam 16, there being screwed vertically through holes screwed on the base of said opening 20 a pair of set screws 21, each provided with an outside wing head 22 and an inner head 23, adapted to rest against the lower face of the wings of said beam 16, so that the length of beam 16 be kept as short as possible, it may be joined with another section of supporting beam 16', designed to be supported in a hole or opening 24, opened in the wall 25 which may be raised up to the height of said beam 16, which section 16' is joined to the same beam 16 by means of side plates 26 which are secured to them by means of bolts 27, provided with wing nuts. Slidably mounted upon the section of supporting beam 16' are two clips 19, which are secured to the beam section 16' at each side of the wall 25 and adjacent to its faces, in order to more firmly secure the position of the supporting beam 16. Preferably, instead of these two clips 19, two vertical plates 19'' may be employed as shown in Fig. 9 of the drawings, each one of which has a T shaped cut 20' through which they mount upon the supporting beam section 16' and on their outer faces have slidably mounted two brackets 21' screwed to each plate 19' two oblique pins 22' which are passing through oblique holes formed in the web of the beam section 16', stops 23' being fixed to the outer face of said plate 19' to serve as retainers for the pins 22' beyond a certain position.

In order to hold together the described base of post 1 with the supporting beam 16 and the post 1 holding the latter in vertical position at the middle point between said base 2 and the supporting beam 16 is located a simple short arm clamp 28 which is secured around the upright 1 by means of bolts 29 and butterfly nuts and this clamp 28 is tied to the base 2 by means of two oblique and diverging braces 30 and 31, made of plates which on their upper ends are fixed by means of one of the bolts 29 between the outer short arms of said clamp 28, whereas on their lower end these oblique braces 30 and 31 are joined to the angular plates 4, fixed to the base 2 by means of bolts 31' with butterfly nuts, thus properly forming the two legs of a tripod, the third leg of which is formed by another plate brace 32, also oblique, which at its upper end is secured by the other bolt 29 between the two inner short arms of said clamp 28 and on its lower end said brace 32 is joined by means of a bolt 33 with butterfly nut to the web of the girder 6, joined to base 2 and in turn the supporting beam 16 is tied to the intermediate clamp 28 by means of a plate brace 34 which on its lower end is fixed by means of the bolt 29 just mentioned between the two inner short arms of said clamp 28 and close to the upper end of the oblique brace 32 and on its upper end said brace 34 is fixed by means of one of the bolts 27 to the plates 26 joining the supporting beam 16 to the extended section 16′ of the same beam.

In order to ease the work of the laborers on the boarding 18′ held by the supporting beams 16 of the scaffold at a convenient height upon these is placed a counter scaffold comprising a clamp 8′, similar to the lower clamp 8, joined to base 2 or one having at one end short arms and long arms at the other, joined by means of a pair of bolts with butterfly nuts, these long arms being provided on their ends with a raised flange 35, in order to act as retainers to the board 36 which is placed upon these long arms and upon the boarding 36 may be placed the bricks 37 or any other material to be used in the work.

In Figs. 13 to 19ª, of the drawings, are represented several modified forms of clamps which are used according to the places of the scaffold and the requirements of the work at hand. Thus, in Fig. 13 is shown a simple clamp 38 provided with arms 39 all of equal length joined by bolts 40 and butterfly nuts. On Fig. 14 is shown a clamp of similar construction to the clamp 38, but divided in four equal right-angle pieces 38′ with arms 39 abutting perpendicularly to the length of the clamp and which are joined together by means of bolts 40 with butterfly nuts. On Fig. 15 is shown a clamp 11′, which is divided into two equal parts following the middle transverse line of the inner space surrounding same, having on that parting line abutments perpendicular to the length of the clamp and the arms 41 of which are joined together by means of bolts 42 and butterfly nuts. On Figures 16, 17, 18 and 19 is shown another modification of the clamp which consists of two bars or plates 43 and 44, bent in U shape and arranged parallelly in order to leave an open space at 45 and having at one end hinged extensions 46 joined by means of a pin or hinge shaft 47 that enables them to have a certain rotary play and in the other end, the bar or plate 43 has a short longitudinally extended arm 43′ whilst the bar or plate 44 has a long arm 44′ joined to the short arm 43′ by means of a bolt 48 with its butterfly nut 49, said long arm 44′ ending on a side extension raised upwards at 50 and having a curved portion 50′ that forms at one side a boss provided with a threaded hole through which passes a bolt 51 provided on its outer end with a butterfly head 51′ and on its inner end with a countersunk head 52 that adjusts or fits into the counter sunk hole 53 that forms said curved portion 50′ on its inner side face. Preferably all these clamps are made so that the bolt 48 that joins the two arms of one end passes in one of the arms through a hole located well below the middle point of the height of the bar and in the other arm, the bolt passes through a slot 54 open from below, so that in order to open the clamp it will be only necessary to loosen the butterfly wing nut 49 and pull the arm provided with the slot 54 outwards in order to separate same from the bolt 48. In Figure 19ª is shown a form of clamp that is a modification of the one illustrated in Figures 16 to 19, and having only two equal short arms 43′ joined by a bolt 48 with its butterfly nut 49.

In Figures 20 and 21 is shown a form of clamp that consists of U shaped clamp 55 the branches of which have threaded reduced ends 55′ on which slides a joining bar 56 that may be tightened by means of nuts 57 that screw onto these reduced ends 55′. Another form of clamp, similar to this one, is shown in Figure 22 and this has the U shaped branches 55″ of the clamp joined by a piece 58, bent in angular form at its ends forming a right angle and the branches of which join the branches of the clamp by means of bolts 59 and their respective nuts.

In Figures 23 to 27, is shown a modified form of scaffold in which this clamp is divided into four equal parts 60 which are of angular plates, forming a vertical portion and a horizontal upper portion with four pairs of arms joined by bolts 61 with their butterfly nuts 62, the transverse arms having a flange or raised lug 61′, 62′, each two of which are joined by means of a horizontal bolt 63 with its wing nut 64 and the supporting beam 16 is square shaped with a vertical portion 16″ that remains in contact with the side face of the upright 1, the horizontal portion 16 and the vertical one 16″ of the supporting beam being joined by a channel cross section brace held by bolts and their respective nuts, and the joining plates 26 are of angular cross section.

In Figures 28 and 29 is shown a modified form of clamp that can be used instead of the clamp 28 and has the extreme short arms of the two parts 65 in which it is divided of equal length, each one of the parts 65 being made of angular cross section plate, the same as the clamp shown in Figures 23 to 27.

In Figure 30 is shown a scaffold comprising a clamp 66, formed by two minor parts made of angular cross section plates with extreme short arms at one end and long arms at the other end, the horizontal flange of the longer arms having an upwardly raised abutment 67, a bolt 68, horizontally placed, passing through a threaded hole of said abutment 67, said bolt having on its inner end a countersunk head 69, adapted to tighten against the board 36, said bolt 68 having on its outside end a butterfly or wing head 70. As shown in Fig. 32, the curved abutment 67 can be made so that it projects from the web or vertical portion of one of the longer arms.

The scaffold 30 can also be formed by means of a clamp divided into four parts 71, each part in double square shape, made of angular cross section plates as shown in Figures 33 and 34 of the drawings, having at one end short arms and long arms at the other end, each two side parts being joined by means of bolts 72 with their respective nuts, said bolts passing through holes in vertical flanges 73, projecting laterally outward from the vertical portions of the parts 71, and by means of bolts 74 with their wing nuts, said latter bolts passing through holes in vertical flanges 75 raised from the horizontal wings of the parts 71, one of the horizontal portions of the longer arms having an upwardly raised abutment 76 on which is threadedly mounted a horizontal bolt 77, provided on its inner end with a countersunk head 78, in order to rest against the side of the board 36 and on its extreme outside a wing head 79 for handling same. The upwardly raised abutment 76 can be arranged as projecting from the web or vertical portion of one of the longer arms, as shown in Figure 35 of the drawings.

It should be understood that the parts of the clamp may be also of T or double T section plates instead of the angular section shown. And the form of the inner space bounded by the U shaped bent portions of the clamp may be instead of square, circular, etc., to adapt itself to the outline of the upright or post 1.

In this scaffold, several attachments are used to join the boards or the uprights together. Thus, in Figures 36 to 40 of the drawings, is shown a joint of two boards 18' head to head, consisting of a plate box 80 closed on its upper, lower and edge portions, and open at the ends, with an intermediate transverse wall 81 and provided with rectangular holes 82 on its upper and lower portions and within which are arranged the heads of the boards 18' that are to be joined, which heads reach to the top with the transverse wall 81 and are secured to the box 80 by means of a plurality of rivets or bolts 83. The joint of two upright sections 1 may be effected by means of a box divided into four members 84, made of double square plate material, each of which embraces the corners of the uprights 1 as shown in Figs. 41 and 42 of the drawings, the portions of each member 84 remaining oppositely placed and at a certain distance one from the other, said portions projecting from each face of the uprights 1 and said portions being joined together by means of a plurality of bolts 85 which have wing-nuts 86. Instead of said box, another type of joint box may be used, as shown in Figures 43 and 44 of the drawings, which comprises solely two plate members 84' bent at a double square on each end to embrace each of the corners of the uprights and which abutting opposite flanges are joined together by means of a plurality of bolts 87 with their wing nuts 88.

The above description set forth, I wish to state that the form of the pieces may be varied without altering the essential character of the invention which is as hereinafter claimed.

What I claim is:

1. A scaffold comprising an upright, a metallic clamp, of suitable shape, adapted to embrace the upright and having long arms projecting from one end, a supporting beam resting on edge upon said projecting arms, means to fix in position the supporting beam upon said arms, a boarding upon said supporting beam, and means on the supporting beam to fix in position the boarding upon said beam.

2. A scaffold comprising an upright, a metallic clamp of suitable shape adapted to embrace the upright and having projecting arms at one end, a supporting beam resting on edge upon said projecting arms, means to fix in position the supporting beam upon the above named arms, a boarding upon said supporting beam and clips slidably mounted upon the supporting beam and having upper flanges to retain in position the boards upon said beam.

3. A scaffold comprising an upright, a metallic clamp of suitable form, adapted to embrace the upright and having projecting arms at one end, a supporting beam resting on edge upon said projecting arms, means to fix in position the supporting beam upon said arms, a boarding upon said supporting beam and clips consisting of vertical plates having cuts so that inside these may fit the transverse section of the supporting beam, vertical bolts passing through the lower part of such cuts and provided with countersunk heads to rest against the wings of the supporting beam, these clips being provided with horizontal flanges in their upper ends to serve as a retainer for the boards upon the supporting beam.

4. A scaffold comprising an upright, a metallic clamp of suitable shape to embrace the upright and having projecting arms at one end, a supporting beam resting on edge upon said projecting arms, a vertical plate adjacent to one of the projecting arms of the clamp and provided with an inner cut of a suitable shape to admit the web of the supporting beam, means to join such vertical plate to the supporting beam, a boarding upon said supporting beam and clips slidably mounted upon the supporting beam and provided with upper flanges to retain in position the boards placed upon such beam.

5. A scaffold comprising an upright, a supporting base for the upright, means to retain in position the lower end of the upright upon said base, a metallic clamp of a shape suitable to embrace the upright at a certain height and having outwardly projecting arms a supporting beam upon these projecting arms, a boarding upon the supporting beam to fix the boards in position upon said beam.

6. A scaffold comprising an upright, a supporting base for the upright, a metallic plate that reinforces the base and has horizontally extended portions, a metallic clamp of a form adapted to embrace the upright upon the base, a girder resting horizontally upon the base and upon the extended portion of the reinforcing plate just cited, the girder being joined to the clamp and to the extended portion of the reinforcing plate by means of bolts, a metallic clamp of a shape suitable for embracing the upright at a certain height above the base and having outwardly extended arms at one end a supporting beam horizontally extended and resting upon said extended arms, a boarding upon the supporting beam and slidable means upon the supporting beam for fixing the boards in position upon the same.

7. A scaffold comprising an upright, a supporting base for the upright, means to retain in position the lower end of the upright upon said supporting base, a metallic clamp of a shape suitable for embracing the upright at a certain height above the base and having outwardly projecting arms at one end, a horizontal supporting beam resting upon said projecting arms, a boarding upon the supporting beam, slidable means upon the supporting beam to fix in position the boards upon the same, a metallic clamp of suitable shape for embracing the upright at the middle of the height between the base and the first named clamp and bracing means joining said intermediate clamp with the supporting beam resting upon the first clamp and with the supporting base.

8. A scaffold comprising an upright, a supporting base for the upright, a metallic plate serving as a reinforcement for the base and having a horizontally extended portion, a metallic clamp of a shape suitable for embracing the upright upon the base, a beam that rests horizontally upon the base and upon a horizontally extended portion of said reinforcing plate, said girder being joined to the clamp and to the extended portion of the reinforcing plate by means of bolts, a metallic clamp of a shape suitable for embracing the upright at a certain height above the base and having outwardly projecting arms at one end, a supporting beam horizontally resting upon said projecting arms, a boarding upon said supporting beam, slidable means upon the supporting beam for fixing in position the boards upon the same, a metallic clamp of a shape suitable for embracing the upright at a certain height, approximately half of it between the base and the first mentioned clamp, and a brace joining the supporting beam with the intermediate clamp, and tripod shaped braces joining the intermediate clamp with the proper supporting base and with the horizontal beam joined to same.

In witness whereof I affix my signature.

ALFONSO VILA.